(12) United States Patent
Rijsbergen et al.

(10) Patent No.: US 7,275,611 B2
(45) Date of Patent: Oct. 2, 2007

(54) AERODYNAMICALLY CONSTRUCTED COVERING PART FOR THE UNDERSIDE OF A PASSENGER CAR, AND METHOD OF MAKING SAME

(75) Inventors: Markus Rijsbergen, Leonberg (DE); Markus Schmid, Moensheim (DE); Martin Grammer, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 419 days.

(21) Appl. No.: 10/950,643

(22) Filed: Sep. 28, 2004

(65) Prior Publication Data

US 2005/0067204 A1    Mar. 31, 2005

(30) Foreign Application Priority Data

Sep. 30, 2003    (DE)    ............... 103 45 328

(51) Int. Cl.
*B60K 11/00*    (2006.01)
*B60K 13/02*    (2006.01)

(52) U.S. Cl. .................. 180/68.1; 180/68.2; 180/68.3

(58) Field of Classification Search ............... 180/68.1, 180/68.2, 68.3
See application file for complete search history.

(56) References Cited

U.S. PATENT DOCUMENTS 4,681,178 A * 7/1987 Brown ...................... 180/68.3
4,690,204 A * 9/1987 Reichel et al. ................. 165/44
4,805,747 A    2/1989 Moedinger et al.
5,513,893 A * 5/1996 Nakata et al. ........... 296/180.1
5,813,491 A * 9/1998 Sato et al. ................... 180/309
5,950,753 A * 9/1999 Muldoon et al. .......... 180/68.1
6,276,482 B1 * 8/2001 Moriya et al. ............... 180/229
2004/0238246 A1 * 12/2004 Ceccarani et al. ......... 180/68.1
2005/0051372 A1 * 3/2005 Guertler ..................... 180/68.1

FOREIGN PATENT DOCUMENTS

| DE | 37 16 701 | 12/1988 |
| DE | G 94 11 368.8 | 10/1994 |
| DE | 89 15 710.9 | 1/1998 |
| DE | 297 20 872 | 2/1998 |
| EP | 1 013 540 | 6/2000 |

* cited by examiner

*Primary Examiner*—Christopher P. Ellis
*Assistant Examiner*—John R. Olszewski
(74) *Attorney, Agent, or Firm*—Crowell & Moring LLP

(57) ABSTRACT

An aerodynamically constructed covering part for the underside of a motor vehicle, particularly a passenger car, is provided with an inflow opening and an air guiding element arranged adjacent to the inflow opening. In the driving operation, a partial flow of the cooling air flowing through between the covering part and the roadway is guided through the inflow opening and the air guiding element situated at least in areas above the covering part to an assembly and/or a chassis part situated above. In order to simplify the fastening between the covering part and the air guiding element, it is provided that the air guiding element is inserted into a receiving opening of the covering part and is separably connected with the covering part by way of slide-detent connections.

35 Claims, 7 Drawing Sheets ated covering part for the underside of a passenger motor car, having an air guiding element arranged adjacent to an inflow opening such that a partial flow of cooling air flows in the driving operation through between the covering part and the roadway and is guided through the inflow opening and the air guiding element to areas above the covering part to an assembly situated above the covering part to be cooled, wherein the air guiding element is inserted into a receiving opening of the covering part and is connected with the covering part by way of slide-detent connections.

AERODYNAMICALLY CONSTRUCTED COVERING PART FOR THE UNDERSIDE OF A PASSENGER CAR, AND METHOD OF MAKING SAME

BACKGROUND AND SUMMARY OF THE INVENTION

This application claims the priority of German Application No. 103 45 328.8-21 filed Sep. 30, 2003, the disclosure of which is expressly incorporated by reference herein.

The invention relates to an aerodynamically constructed covering part for the underside of a motor vehicle. Preferred embodiments relate to such a covering part for a passenger car, having an air guiding element arranged adjacent to an inflow opening. In the driving operation, a partial flow of the cooling air flowing through between the covering part and the roadway is guided through the inflow opening and the air guiding element to areas above the covering part to an assembly and/or a chassis part situated above.

Such a covering part is known from German Patent Document DE 37 16 701 A1 (corresponding U.S. Pat. No. 5,025,878). In this arrangement, the air guiding element is formed by a blade-shaped holding element arranged adjacent to the inflow opening. On one side, this holding element is fastened to the covering part and, on the other side, to the transmission case situated above. This double fastening requires relatively large mounting expenditures and is very time-intensive.

It is an object of the invention to further develop a covering part for the underside of a motor vehicle provided with an air guiding element such that the fastening between the covering part and the air guiding element is simplified.

According to the invention, this object is achieved by providing an aerodynamically constructed covering part for the underside of a passenger motor car, having an air guiding element arranged adjacent to an inflow opening such that a partial flow of cooling air flows in the driving operation through between the covering part and the roadway and is guided through the inflow opening and the air guiding element to areas above the covering part to an assembly situated above the covering part to be cooled, wherein the air guiding element is inserted into a receiving opening of the covering part and is connected with the covering part by way of slide-detent connections.

Other advantageous features of preferred embodiments of the invention are described herein and in the claims.

Important advantages achieved by certain preferred embodiments of the invention are that, by means of the suggested slide-detent connection between the covering part and the air guiding element, a fast and secure connection is established between the two components. Additional fastening elements, such as screws or the like, and mounting tools are not required. Different air guiding elements can be combined with the same covering part by means of this fastening concept according to certain preferred embodiments of the invention. This means that a high geometric freedom is achieved when designing the aerodynamically effective areas as well as a variant formation with an identical basic geometry.

The multiple-action separable detent connection and the locally arranged supporting ribs ensure a play-free connection between the two components according to certain preferred embodiments of the invention. The used air guiding element is supported in the fastening area alternately at the top side and bottom side of the covering part according to certain preferred embodiments of the invention.

An embodiment of the invention is explained in detail by means of the drawing.

Other objects, advantages and novel features of the present invention will become apparent from the following detailed description of the invention when considered in conjunction with the accompanying drawings.

BRIEF DESCRIPTION OF THE DRAWINGS

A motor vehicle constituted as a passenger car, which is not shown, is equipped with an aerodynamically constructed covering part 1 on its underside. In the direction of a roadway, the covering part 1 has a smooth-surface construction and, in a manner known per se, is held at the vehicle body situated above it. It preferably covers the entire vehicle underside and may be constructed in one or more parts. In the embodiment shown, the covering part 1 is preferably formed by an injection-molded part made of a plastic material and constructed of several parts.

Figure 1:
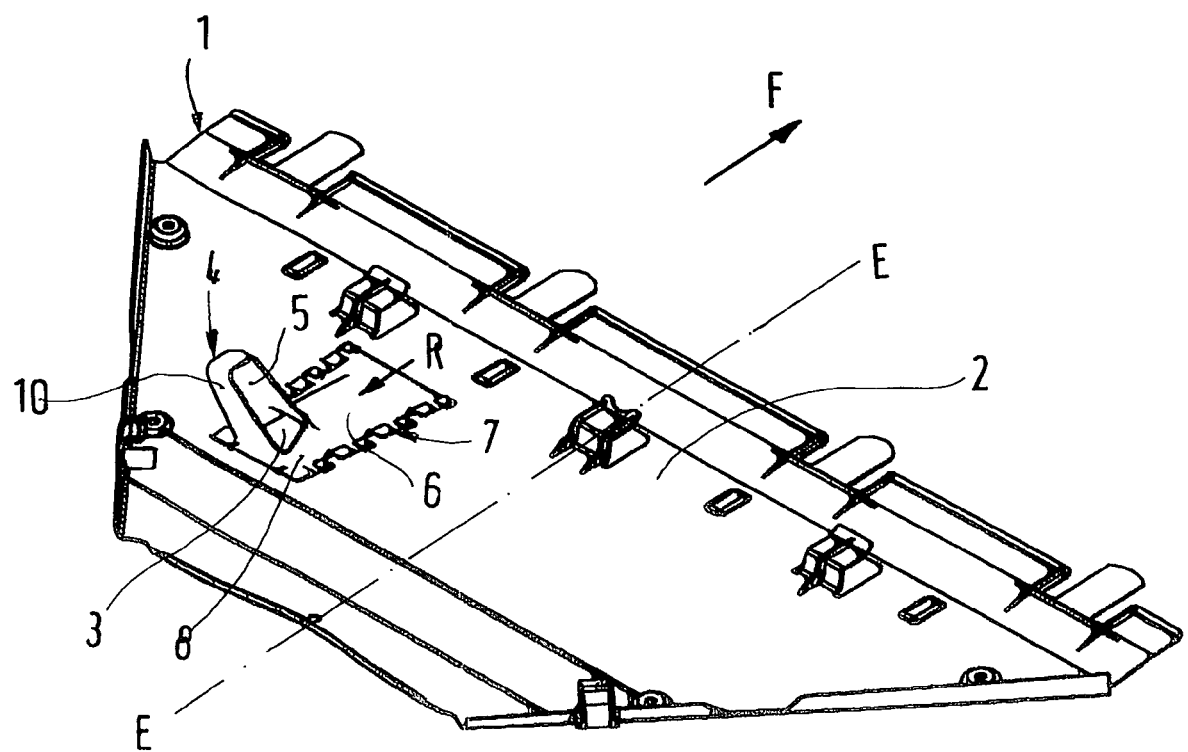
FIG. 1 is a perspective view diagonally from the rear of a partial area of a covering part for the underside of a motor vehicle with the air guiding element, constructed according to preferred embodiment of the invention.

FIG. 1 shows a rear-side partial area 2 of the covering part 1 which, in the embodiment shown, tapers toward the rear against the driving direction F. The covering part 1 has locally at least one inflow opening 3 on its underside as well as an air guiding element 4, in which case, in the driving operation of the motor vehicle, a partial flow A of the cooling air flowing through between the covering part 1 and the roadway is guided through the inflow opening 3 of the air guiding element 4 by way of an outflow opening 5 provided on the air guiding element 4 to an assembly and/or a chassis part situated above and cools the latter. In the embodiment shown, cooling air is guided to a rear-axle transmission which is not shown in detail.

Figure 7:
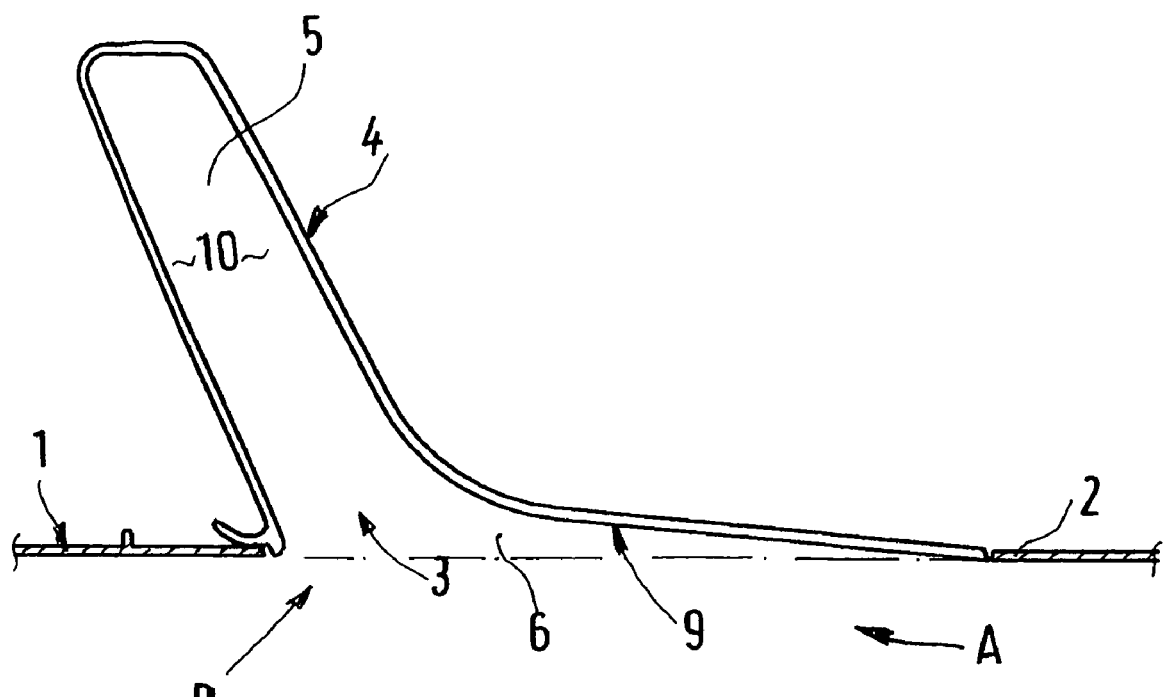
FIG. 7 is a vertical longitudinal sectional view of the covering part and the inserted air guiding element in the mounted position D.

The air guiding element 4 is inserted into a receiving opening 6 of the covering part 1 from side B of the covering part 1 facing the roadway, that is, from the direction of the underside. It is separably connected with the covering part 1 by way of slide-detent connections 7 acting on the edge side. According to FIG. 7, the inflow opening 3 is constructed on the air guiding element 4. The air guiding element 4 also formed by an injection-molded plastic part has a plate-shaped basic body 7 with an approach flow duct 9 disposed in front of the inflow opening 3, which approach flow duct 9 is adjoined by an upward-projecting air guiding duct 10 which is provided with a lateral outflow opening 5.

Figure 5:
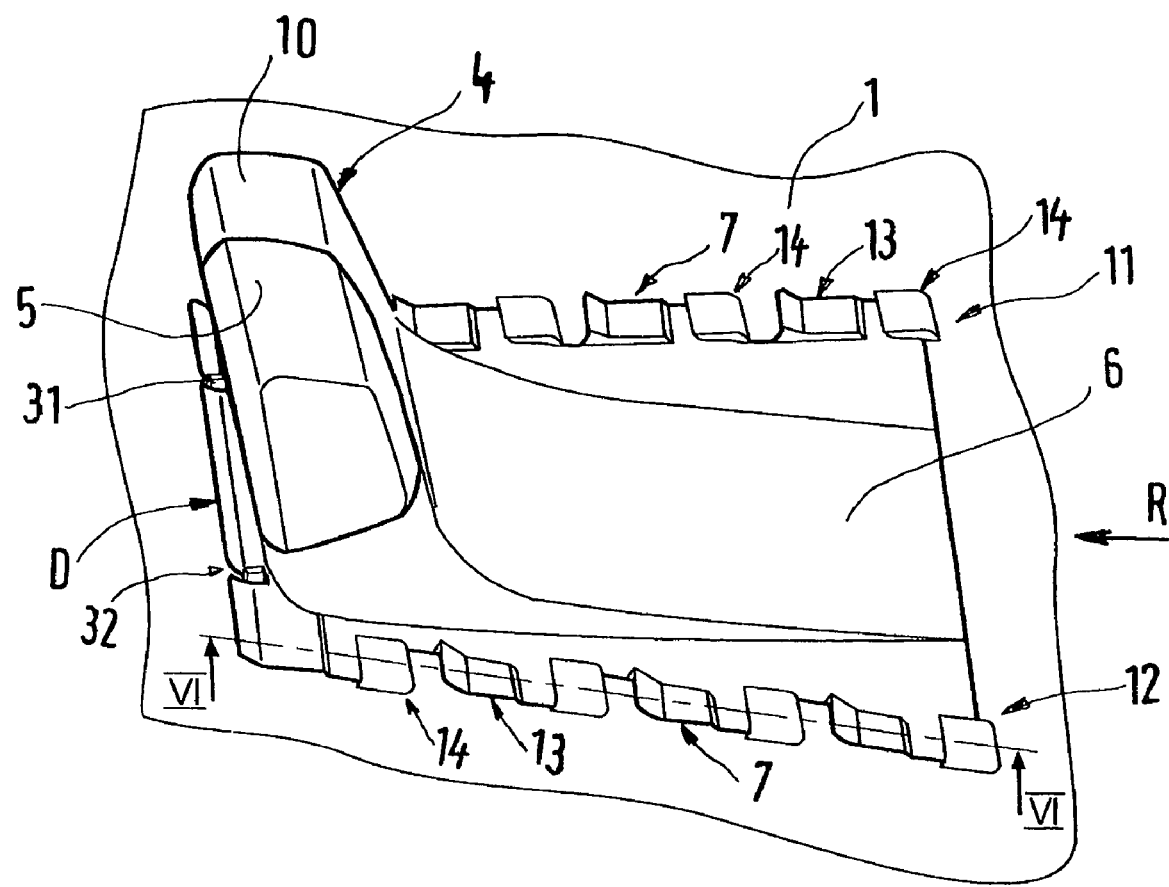
FIG. 5 is a perspective view similar to FIG. 4 but in the mounted position of the air guiding element.

The slide-detent connections 7 comprise detent elements 13 constructed on opposite longitudinal sides 11, 12 of the air guiding element 4, which detent elements 13 interact in a locking manner with holding sections 14 provided on the edge side on the receiving opening 6 of the covering part 1. In the mounted position, each detent element 13 of the air guiding element 4 is in an operative connection (FIG. 5) with two spaced holding sections 14 of the covering part 1.

According to FIG. 1, the receiving opening 6 is arranged to be laterally offset with respect to longitudinal center plane E-E of the motor vehicle on the covering part 1 and, in the top view, has an approximately four-cornered basic shape. In the embodiment shown, the oblong receiving opening 6 extends in the longitudinal direction of the vehicle and has an approximately trapezoidal construction. The two sides 15, 16 extending in parallel to one another are aligned in the transverse direction of the vehicle and form the forward end and the rearward end respectively of the receiving opening 6. The diagonally extending sides 17, 18 of the receiving opening 6 extend in the longitudinal direction of the motor vehicle. According to FIG. 1, the conical receiving opening 6 tapers toward the rear to the rear end of the motor vehicle. However, the receiving opening 6 may also have a rectangular or similar construction.

Figure 2:
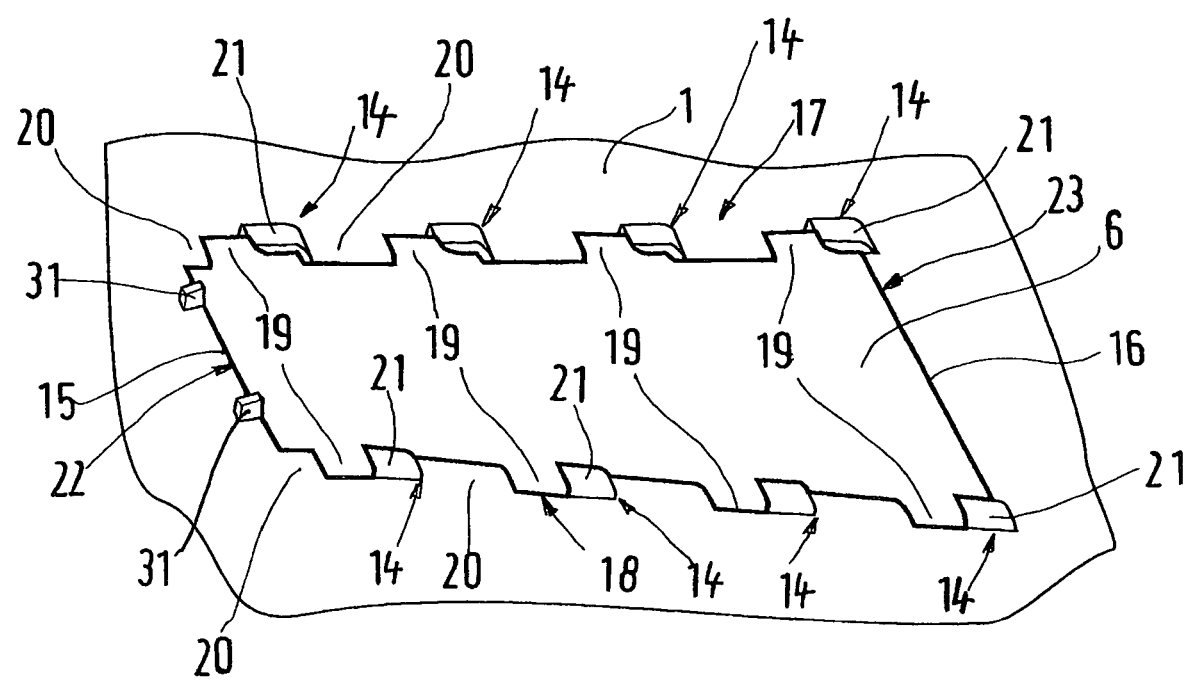
FIG. 2 is a perspective view of the covering part of FIG. 1 with the receiving opening.

At the opposed longitudinally oriented sides 17, 18 of the receiving opening 6, several mutually spaced holding sections 14 are in each case constructed, in which case, viewed in the top view, an approximately U-shaped recess 19 is constructed between two adjoining holding sections 14. The holding sections 14 provided at a distance from the forward and rearward edge of the receiving opening 6 are formed by holding lugs 20, 21 which are arranged in a step shape and are disposed behind one another. The adjoining holding lugs 20, 21 have a vertical offset with respect to one another. The holding lugs 20 extend flush with the skin with respect to the covering part 1, whereas the holding lugs 21 are bent away from the covering part 1 in the upward direction. Adjacent to the forward edge 22 of the receiving opening 6, one holding lug 20 respectively extending in the plane of the covering part 1 is constructed on both longitudinal sides 17, 18, and adjacent to the rearward edge 23 of the receiving opening 6, one holding lug 21 respectively is constructed which is situated at a higher level (FIG. 2).

Figure 3:
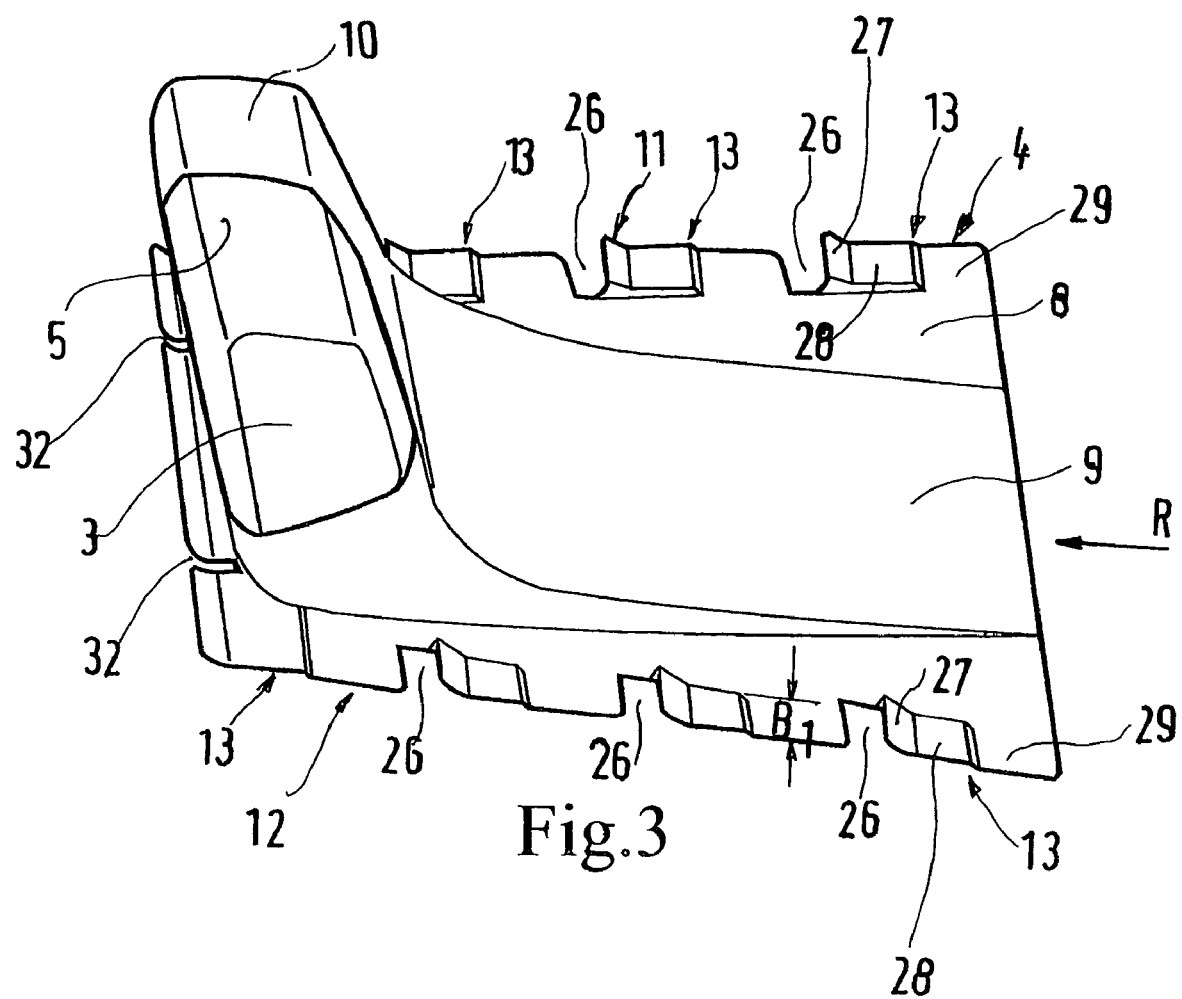
FIG. 3 is a perspective view of the air guiding element of FIG. 1.
Figure 4:
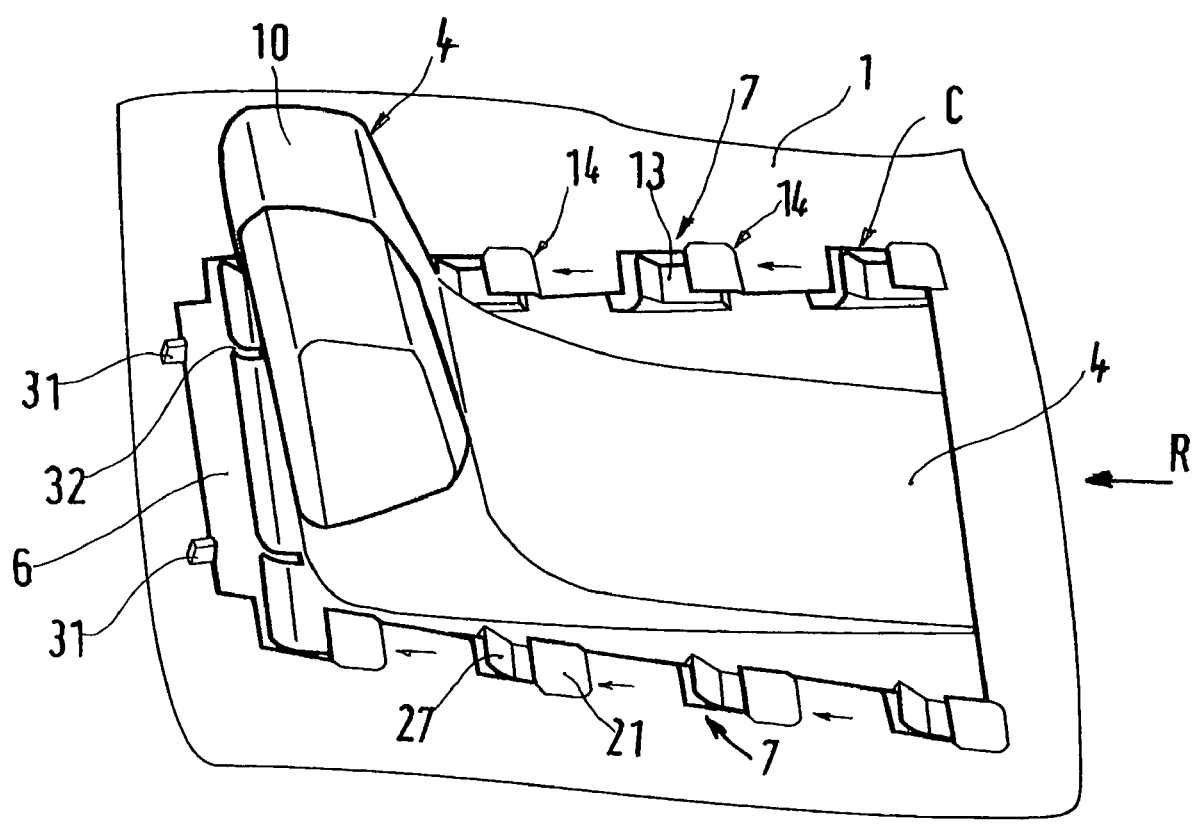
FIG. 4 is a perspective view of the air guiding element with the receiving opening and the inserted air guiding element in an insertion position, of the arrangements of FIGS. 1-3.

Several longitudinally mutually spaced, outward-projecting detent elements 13 are in each case molded to the two opposite longitudinal sides 11, 12 of the air guiding element 4 which extend in the longitudinal direction of the motor vehicle, one recess 26 respectively, which is approximately U-shaped in the top view, being constructed between two adjoining detent elements 13 (FIG. 3).

In the embodiment shown, four detent elements 13 respectively arranged behind one another are provided on the two longitudinal sides 11, 12 of the air guiding element 4 (FIG. 3). More or fewer detent elements 13 for each longitudinal side may also be arranged on the air guiding element 4.

Viewed in the slide-in direction R, each detent element 13 has a diagonally upward-projecting insertion section 27, an adjoining first supporting section 28 and a following second supporting section 29. The second supporting section 29 extends approximately flush with the contour of the covering part 1, whereas the first supporting section 28 is bent away in the upward direction. The detent elements 13 each have a longitudinal course L1 (FIG. 6) and a width B1 (FIG. 3).

Figure 6:
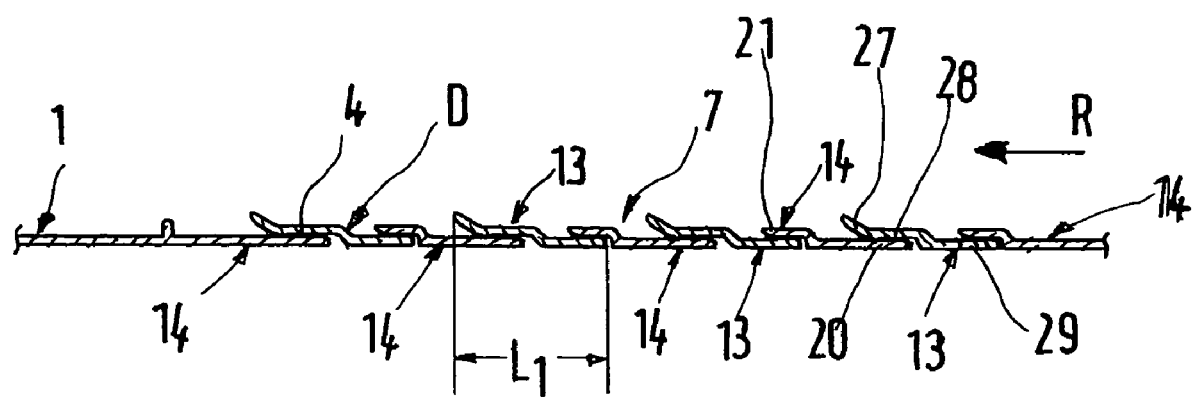
FIG. 6 is a sectional view taken along line VI-VI of FIG. 5.

When the air guiding element 4 is inserted, the bottom side of the first supporting section 28 rests on the top side of the holding lug 20 which is situated lower, whereas the top side of the second supporting section 29 rests on the bottom side of the holding lug 21 which is situated higher (FIG. 6).

One transversely extending, protruding knob-type supporting rib respectively (not shown in detail) is constructed on the forward edge of the bottom side of the first supporting section 28 and on the rearward edge of the top side of the second supporting area 29 of the detent elements 13. As a result of this measure, a play-free and rattle-free connection is established between the air guiding element 4 and the covering part 1. Adjacent to the edge of the receiving opening 6, at least one guide rib 31, which extends in the longitudinal direction, is provided on the side of the covering part 1 facing away from the roadway. In the mounted position D, this guide rib 31 is in an operative connection with a slot opening 32 of the air guiding element 4 (FIGS. 2 and 3).

The mounting of the air guiding element 4 takes place as follows: First, the air guiding element 4 is inserted from below into the receiving opening of the covering part 1. The insertion position C has been reached when all insertion tongues 27 of the air guiding element 4 project into the area of the recesses 19. During the subsequent displacement of the air guiding element 4 in the slide-in direction R, the insertion tongues 27 are supported first on the top side of the holding sections. As a result of a further longitudinal displacement of the air guiding element 4 in the slide-in direction R, the detent connections 7 are established, and the air guiding element 4 takes up its mounted position D.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Aerodynamically constructed covering part having a receiving opening and being locatable on an underside of a passenger motor car, comprising an air guiding element insertable into the receiving opening and arranged adjacent to an inflow opening such that a partial flow of cooling air flows in the driving operation through between the covering part and the roadway, and is guided through the inflow opening and the air guiding element to areas above the covering part to an assembly situated above the covering part to be cooled, wherein slide-detent connections lockingly connect the air guiding element and the covering part.

2. Covering part according to claim 1, wherein the inflow opening is constructed on the air guiding element.

3. Covering part according to claim 1, wherein the air guiding element has a plate-shaped basic body with an approach flow duct disposed in front of the inflow opening, which approach flow duct is followed by an upward-projecting air guiding duct which is provided with an outflow opening.

4. Covering part according to claim 2, wherein the air guiding element has a plate-shaped basic body with an approach flow duct disposed in front of the inflow opening, which approach flow duct is followed by an upward-projecting air guiding duct which is provided with an outflow opening.

5. Covering part according to claim 1, wherein the slide-detent connections comprise detent elements constructed on opposed sides of the air guiding element, which detent elements interact with holding sections provided on the edge side at the receiving opening of the covering part.

6. Covering part according to claim 5, wherein each detent element of the air guiding element is in an operative connection with two spaced holding sections of the covering part.

7. Covering part according to claim 1, wherein the air guiding element is insertable into the receiving opening from a side of the covering part facing the roadway.

8. Covering part according to claim 1, wherein, in a top view, the receiving opening has a four-cornered rectangular or trapezoidal basic shape.

9. Covering part according to claim 1, wherein two longer opposites sides of the receiving opening extend in a longitudinal direction of the motor vehicle.

10. Covering part according to claim 8, wherein two longer opposites sides of the receiving opening extend in a longitudinal direction of the motor vehicle.

11. Covering part according to claim 8, wherein the receiving opening tapers conically.

12. Covering part according to claim 10, wherein the receiving opening tapers conically.

13. Covering part according to claim 5, wherein several mutually spaced holding sections respectively are constructed on opposed sides of the receiving opening, in the top view, one approximately U-shaped recess respectively being constructed between two adjoining holding sections.

14. Covering part according to claim 13, wherein the holding sections provided away from the forward and rearward edge of the receiving opening are each formed by holding lugs which are arranged in a step shape and are situated behind one another, the holding lugs extending flush with the skin with respect to the covering part but the holding lugs being bent away from the covering part in the upward direction.

15. Covering part according to claim 5, wherein several mutually spaced, outward-projecting detent elements respectively are molded to the two opposed longitudinal sides of the air guiding element one recess respectively, which is approximately U-shaped in the top view, being provided between two adjoining holding elements.

16. Covering part according to claim 13, wherein several mutually spaced, outward-projecting detent elements respectively are molded to the two opposed longitudinal sides of the air guiding element one recess respectively, which is approximately U-shaped in the top view, being provided between two adjoining holding elements.

17. Covering part according to claim 14, wherein each detent element has a diagonally upward projecting, forward insertion section, an adjoining first supporting section and a following second supporting section, the second supporting section extending flush with the covering part.

18. Covering part according to claim 16, wherein each detent element has a diagonally upward projecting, forward insertion section, an adjoining first supporting section and a following second supporting section, the second supporting section extending flush with the covering part.

19. Covering part according to claim 17, wherein, when the air guiding element is inserted, the bottom side of the first supporting section is supported on the top side of the lower-lying holding lug, whereas the top side of the second supporting section rests on the bottom side of the higher-lying holding lug.

20. Covering part according to claim 17, wherein one transversely extending, protruding knob-shaped supporting rib respectively is constructed at the forward edge of the bottom side of the first supporting area section at the rearward edge of the top side of the second supporting area of the detent elements.

21. Covering part according to claim 1, wherein at least one longitudinally extending guide rib, which is in an operative connection with a slot opening of the air guiding element, extends adjacent to the edge of the receiving opening on the interior side of the covering part.

22. Covering part according to claim 15, wherein at least one longitudinally extending guide rib, which is in an operative connection with a slot opening of the air guiding element, extends adjacent to the edge of the receiving opening on the interior side of the covering part.

23. Covering part according to claim 17, wherein the inflow opening is constructed on the air guiding element.

24. Covering part according to claim 1, wherein the assembly to be cooled is a rear axle transmission.

25. A covering part assembly for an underside of a passenger motor vehicle comprising:
   a covering part which in use is disposed at an underside of a vehicle and includes a receiving opening and an aerodynamically smooth surface facing a roadway over which the vehicle is traveling,
   an air inflow opening in the covering part,
   an air guiding element for guiding flow of air from the air inflow opening to a vehicle assembly to thereby cool said assembly, and
   slide-detent connections for lockingly connecting the air guiding element with the covering part.

26. An assembly according to claim 25, wherein the inflow opening is constructed on the air guiding element.

27. An assembly according to claim 26, wherein the air guiding element has a plate-shaped basic body with an approach flow duct disposed in front of the inflow opening, which approach flow duct is followed by an upward-projecting air guiding duct which is provided with an outflow opening.

28. An assembly according to claim 27, wherein the slide-detent connections comprise detent elements constructed on opposed sides of the air guiding element, which detent elements interact in a locking manner with holding sections provided on the edge side at the receiving opening of the covering part.

29. An assembly according to claim 28, wherein each detent element of the air guiding element is in an operative connection with two spaced holding sections of the covering part.

30. An assembly according to claim 29, wherein the air guiding element is inserted into the receiving opening from a side of the covering part facing the roadway.

31. A method for making a covering part assembly for an underside of a passenger motor vehicle comprising:
   disposing a covering part with a receiving opening at an underside of a vehicle, which covering part includes an aerodynamically smooth surface facing a roadway over which the car is traveling during use thereof,
   providing an air inflow opening in the covering part, and
   inserting an air guiding element for guiding flow of air to the covering part from the air inflow opening to a vehicle assembly to thereby cool said assembly, and
   lockingly connecting the air guiding element with the covering part by way of slide-detent connections.

32. A method of making a covering part assembly according to claim 31, wherein the inflow opening is constructed on the air guiding element.

33. A method of making a covering part assembly according to claim 32, wherein the air guiding element has a plate-shaped basic body with an approach flow duct disposed in front of the inflow opening, which approach flow duct is followed by an upward-projecting air guiding duct which is provided with an outflow opening.

34. A method of making a covering part assembly according to claim 33, wherein the slide-detent connections comprise detent elements constructed on opposed sides of the air guiding element, which detent elements interact in a locking manner with holding sections provided on the edge side at the receiving opening of the covering part.

35. A method of making a covering part assembly according to claim 33, wherein the air guiding element is inserted into the receiving opening from a side of the covering part facing the roadway.

* * * * *